United States Patent [19]

Compton et al.

[11] Patent Number: 5,742,403
[45] Date of Patent: Apr. 21, 1998

[54] TEST APPARATUS AND METHODS FOR A DIGITAL IMAGE SCANNING SYSTEM

[75] Inventors: John Thomas Compton, LeRoy; Jon Leon Hoeft, Rochester, both of N.Y.

[73] Assignee: Eastman Kodak Company, Rochester, N.Y.

[21] Appl. No.: 621,300

[22] Filed: Mar. 22, 1996

Related U.S. Application Data

[60] Provisional application No. 60/000,664 Jun. 29, 1995.

[51] Int. Cl.⁶ .............................. H04N 1/00; H04N 1/40; H04N 17/00; G01C 25/00
[52] U.S. Cl. .................... 358/406; 358/443; 358/445; 348/180; 348/181; 348/187; 364/571.01
[58] Field of Search .................... 358/406, 443, 358/445, 483; 348/245, 246, 247, 251, 252, 187, 180, 181; 364/571.01; 382/321, 141

[56] References Cited

U.S. PATENT DOCUMENTS

| | | | |
|---|---|---|---|
| 4,509,077 | 4/1985 | Therrien | 258/139 |
| 4,631,598 | 12/1986 | Burkhardt et al. | 358/280 |
| 4,852,063 | 7/1989 | McNutt | 365/185 |
| 5,086,343 | 2/1992 | Cook et al. | 358/213.15 |
| 5,260,784 | 11/1993 | Kamiyama et al. | 358/139 |
| 5,309,376 | 5/1994 | Barraco et al. | 364/571.01 |

*Primary Examiner*—Edward L. Coles, Sr.
*Assistant Examiner*—Tia M. Harris
*Attorney, Agent, or Firm*—Francis H. Boos, Jr.

[57] ABSTRACT

In a digital image scanning system, dynamic testing of digital and analog channels is performed by injecting photosite-by-photosite variable test data to simulate imager signals. The test data is stored at photosite related addresses in random access memory means and are accessed by a pixel (photosite) counter for output to the channels under test.

5 Claims, 2 Drawing Sheets

TEST APPARATUS AND METHODS FOR A DIGITAL IMAGE SCANNING SYSTEM

CROSS REFERENCE TO RELATED APPLICATION

Reference is made to and priority claimed from U.S. Provisional Application Ser. No. 60/000,664, filed 29 Jun. 1995, entitled TEST APPARATUS AND METHODS FOR A DIGITAL IMAGE SCANNING SYSTEM.

FIELD OF THE INVENTION

The invention relates generally to the field of digital image scanning systems and more particularly to apparatus and methods for periodically testing the performance of such scanning systems.

BACKGROUND OF THE INVENTION

Although the present invention will be described in the context of an image scanner system utilizing a linear scanning device, it will be appreciated by those skilled in the art that the principles discussed herein are equally applicable to systems utilizing a two dimensional array scanner device. A solid state linear digital image scanner system comprises a linear array of light detecting sites (photosites), some mechanism for providing relative motion between the original image to be sampled and the linear array, and some signal processing circuitry which conditions the signal from the linear array and converts it to a form useful for the application at hand. Typically the linear array is a linear charge coupled device (CCD) imager. The signal processing circuitry typically converts the sampled image into digital values for further processing by a computer. In such a system, it is desirable to be able to provide test signals at various points in the signal processing circuitry to allow for calibration and diagnostics of the system. As will be seen, the present invention is directed to an improved apparatus and method allowing for more complex test signals to be generated than is presently known to be employed.

FIG. 1 shows a typical arrangement of circuit elements in the signal processing circuitry of a CCD based linear scanner. The linear imager 10 integrates the charges produced by each photosite in the imager for a period of time and then transfers the charges to a shifting structure so that the charges can be shifted out of the imager in a serial fashion. The signal produced by the imager for each photosite comprises two phases: a reference phase followed by a video phase. The reference phase provides a reference level against which the following video phase may be compared. The video phase represents the magnitude of charge accumulated by the photosite. The serial signal coming from the linear imager 10 is amplified by amplifier 11, the output of which goes to a subtracter circuit 22 and a reference sample and hold circuit 20. The reference sample and hold circuit samples the signal from the imager during each photosite's reference phase. The subtracter removes the sampled and held reference signal from the subsequent video phase. Hence, the output of the subtracter 22 is normalized to the reference level. This normalized signal is sampled by the video sample and hold circuit 23 during the video phase of the signal provided by the imager. The sampled and held normalized video is operated on by a multiplier 25 and a summer 27. These two circuit elements operate in known manner to provide gain and offset compensation for variations in photosite sensitivity, nonuniformity of illumination, variations in signal offset, and so on. The digital to analog converter 26 provides the gain correction value for multiplier 25 and the digital to analog converter 28 provides the offset correction value for summer 27. Data words are provided to the two analog to digital converters upon the arrival of the normalized video signal for each photosite by the pixel counter 50, the memory 52, and the gain/offset data latch 29. The counter increments synchronously with the readout of the photosite signals from the imager. The output of the counter is used to provide an address to the memory 52 which holds gain and offset values for each photosite. The gain and offset data output from the memory 52 is latched by the gain/offset data latch which provides the data to the digital to analog converters. The buffer 53 allows the microprocessor 100 to gain access to the memory 52 in order to change the gain and offset values as the result of a prescribed calibration process. During a time when its counting is disabled, the pixel counter 50 may be loaded with a value from the microprocessor in order to provide an address to the memory to which the microprocessor can write. The analog to digital converter 30 converts the normalized, gain and offset corrected video signal to a numeric value which is latched by a video data latch 31 and optionally provided as an address to a lookup table (LUT) memory 40 by buffer 32. The LUT memory is typically used in a photographic image scanning system to change the linear digital value representative of film density to a logarithmic exposure value useful for further image processing. The output of the LUT memory 40 is then written to a first-in-first-out (FIFO) memory 45 for subsequent readout by the microprocessor 100.

FIG. 1 also shows a prior art test signal known for use in a linear scanner of the type just described. In order to test the digital data path through the FIFO back to the microprocessor, a digital test value is provided to replace the output of the analog to digital converter 30. This is accomplished by a test data latch 33 to which the microprocessor 100 can write a digital test value. When the scanning system is put into digital test mode, buffer 32 is disabled to block the output of the video data latch 31 and buffer 34 is enabled to provide the output of the test data latch 33 as an address to the LUT memory 40. The addition of a buffer 46 allows microprocessor 100 to have access to the LUT memory with the LUT memory 40 address being provided by the test data latch 33. This allows the LUT memory to be alterable by the microprocessor.

In order to test the analog signal path, an analog test value is provided to replace the output of the linear imager. For this operation, amplifier 11 is disabled to prevent the imager output from entering the signal processing circuitry and amplifier 70 is enabled to provide the analog test signal to the signal processing circuitry. The analog test signal is generated from digital data provided from a programmable read-only memory (PROM) 74 which is coupled to digital-to-analog (D/A) converter 73 which, in turn, feeds into amplifier 76. One of the address inputs to PROM 74 is the phase clock signal which controls the switching of the imager output from reference phase to video phase. When the phase clock signal indicates that the reference phase is active, the data selected in PROM 74 will cause a reference level signal to be output by D/A converter 73 regardless of the other address inputs to the PROM. When the phase clock signal indicates that the video phase is active the data selected in the PROM by the phase clock signal and the other address inputs will cause a video level signal to be output by D/A converter 73. The other address inputs are provided by a test signal select latch 75 which is written to by the microprocessor 100. This allows the video level of the analog test signal to be selected from among several levels programmed into the PROM. In this illustrated arrangement, the three address lines from test signal select latch 75 to PROM 74 allow the selection of eight different video level test signals.

There is a significant shortcoming to the test generators described above. The test signals are static in nature. They do not change from sample to sample corresponding to photosite-to-photosite changes from the actual imaging device. Hence, as a simulated replacement signal for an actual signal, they do not exercise the circuitry in the same way that an actual signal would. Because of this, some characteristics of the signal processing circuitry which depend on a dynamically changing signal (noise, response time, etc.) cannot be evaluated with the test signal arrangement shown in FIG. 1.

SUMMARY OF THE INVENTION

Thus, in accordance with the invention, there is provided test apparatus for an image scanning system of the type having a digital imaging device with at least one line of light-responsive photosites for producing a linear scan of image pixel signals and a signal processing channel for processing the image pixel signals derived from the imaging device, wherein the test apparatus comprises means for supplying a map of test data signals simulating photosite-by-photosite data signals from the imaging device, counter means for supplying count values corresponding to individual photosites in the imaging device, and memory means for storing the map of test data signals at memory addresses corresponding to the photosite count values. The test apparatus further comprises means operative during a test operation for inhibiting processing in the signal channel of image pixel signals from the imaging device, and test signal supply means responsive to the counter means and memory means during the test operation for supplying the test data signals on a simulated photosite-by-photosite basis for processing in the signal channel.

In accordance with another aspect of the invention, there is provided a method of testing the digital image scanning system comprising the steps of supplying a map of test data signals simulating photosite-by-photosite data signals from the imaging device; storing the map of test data signals in memory means at memory addresses corresponding to individual photosites in the imaging device, initiating a test operation by inhibiting processing in said signal channel of image pixel signals from said imaging device; and supplying said test data signals on a photosite-by-photosite basis for processing in said signal channel.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
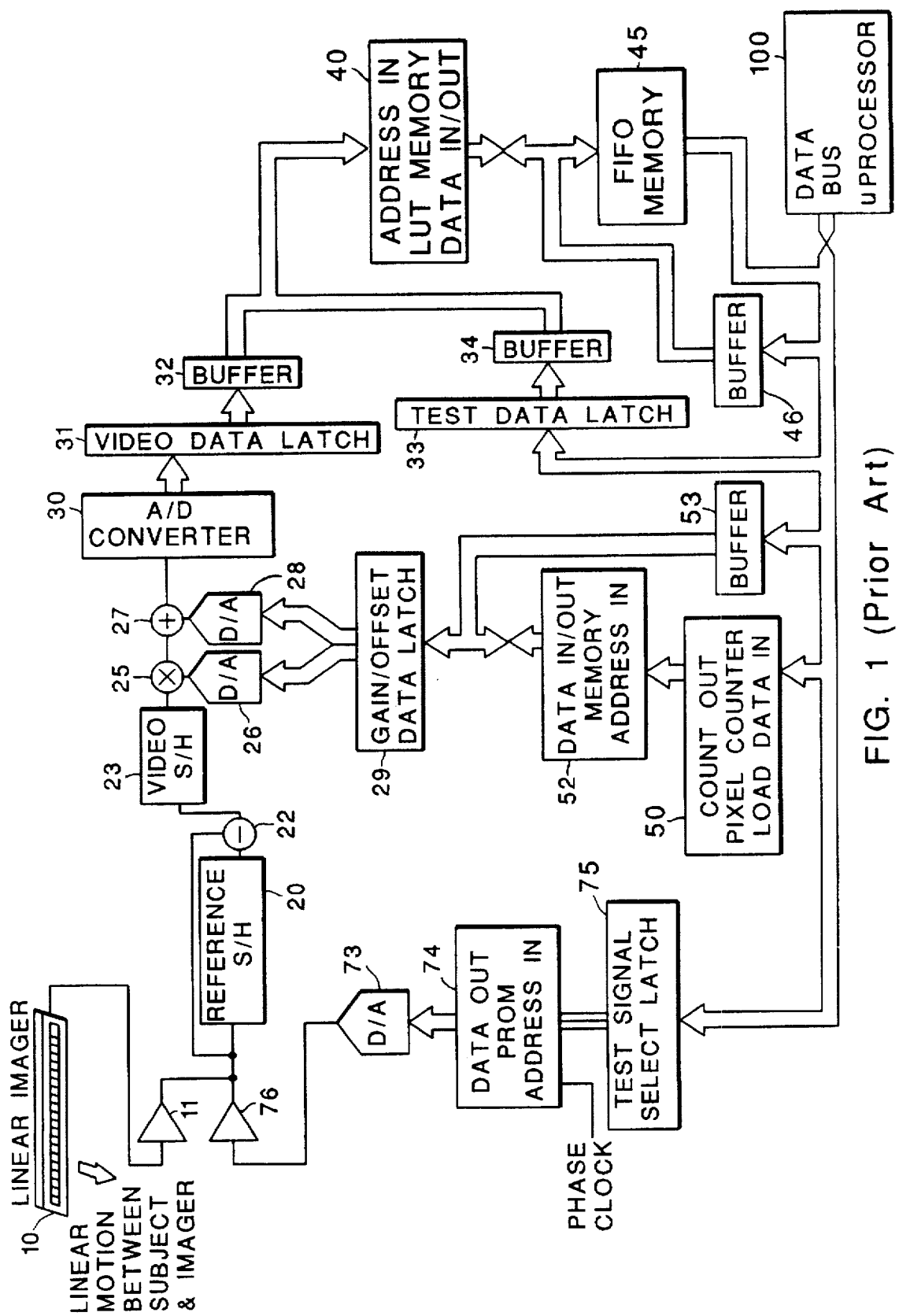
FIG. 1 is a digital image scanning system embodying prior art apparatus for testing performance of the circuits in the system.
Figure 2:
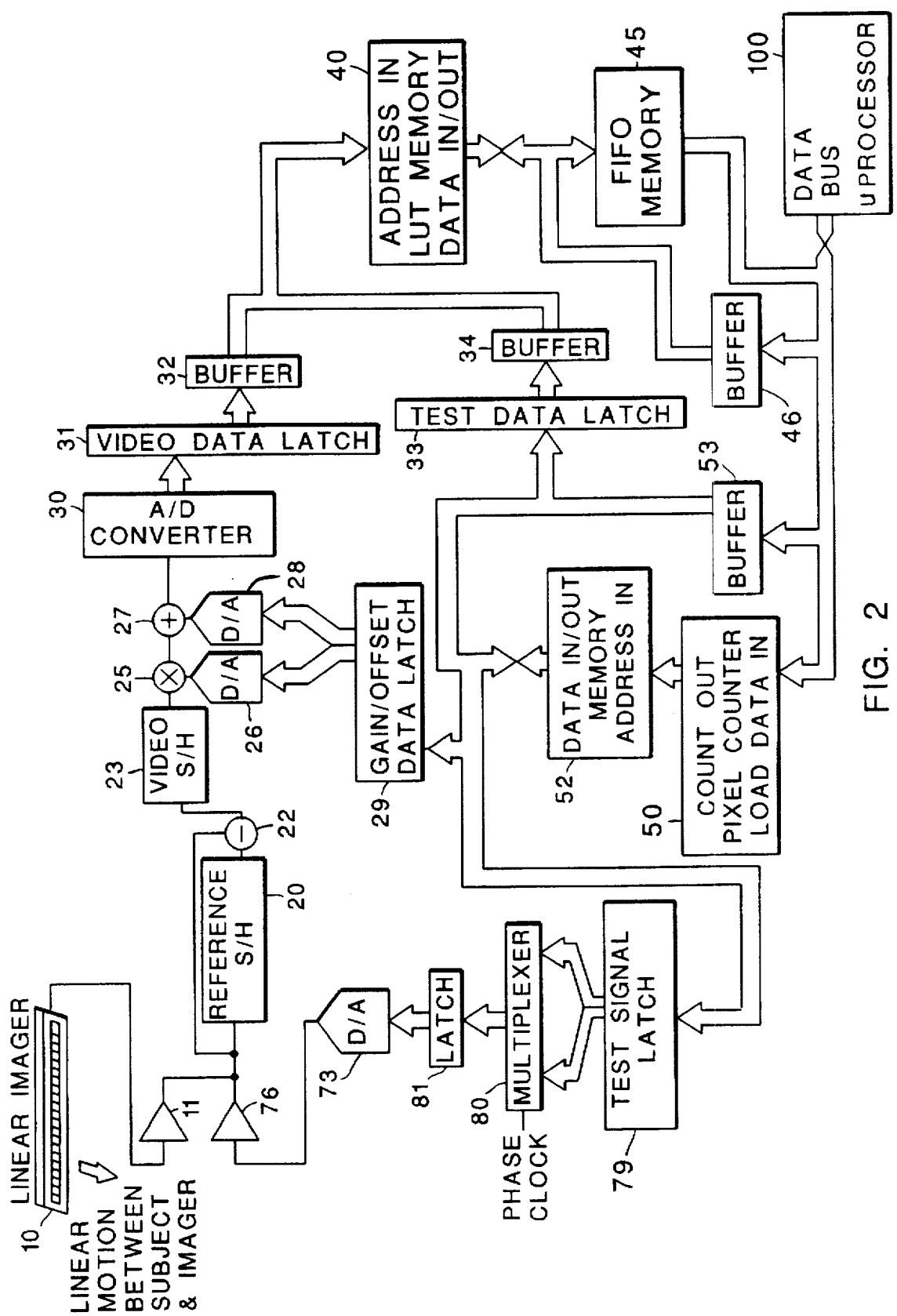
FIG. 2 is a functional block diagram a digital image scanning system embodying test apparatus and methods in accordance with the present invention.

FIG. 2 shows an image scanning system similar to the system of FIG. 1 except for provision of modified test apparatus embodying the present invention. Like elements and circuits carry the same reference numerals while newly added or modified elements and circuits carry new reference numerals. Thus, as with the system of FIG. 1, the image scanning system includes a digital imaging device 10 illustrated as a linear scanner but which may be a two dimensional array device having more than one line of light responsive photosites. The overall signal processing channel for the system includes an analog channel, comprised of the previously described circuits 20 through 30, and a digital channel including LUT memory 40 and FIFO memory 45. During test operation, buffer 53 comprises means for supplying a map of test data signals, provided from microprocessor 100, which correspond to and simulate, on a photosite-by-photosite basis, signals from the imaging device 10. Pixel counter 50 serves as counter means for supplying count values corresponding to individual photosites in the imaging device. Random access memory 52 serves to store the map of test data signals at memory addresses corresponding to the photosite counts provided by pixel counter 50.

In operation, during testing of the image scanning system, microprocessor 100 may be programmed to place the system into either or both the digital and analog test modes. Alternatively, the test modes may be selected manually by suitable switching means (not shown). When placed in the digital test mode for testing the digital channel, the gain and offset values normally provided by the memory 52 to the analog channel are not needed for that purpose. Accordingly, the photosite variable gain and offset data stored in memory 52 is supplied directly to the test data latch 33 for use as digital test data in testing the operation of the digital channel (LUT memory 40 and FIFO memory 45). Alternatively, since the gain and offset circuitry is ignored during operation in the digital test mode, the microprocessor 100 can write an arbitrary test pattern into the gain and offset memory for use by the test data latch 33 in place of the normal gain and offset data. As a further alternative operation, a separate part of the memory 52 can be set aside for digital test data and an address line (not shown) into the memory may be controlled synchronously with the counting of pixel counter 50 in order to alternately select gain and offset data and test data.

When the image scanning system is placed in the analog test mode, photosite variable analog test data, composed of simulated reference data and video data, is provided by microprocessor 100 and stored in memory 52. During testing, the analog test data is read out of the memory 52 alternately with the gain and offset data and is captured by test signal latch 75. Multiplexer 80 is controlled by the same phase clock signal used to control operation of the imager 10 so that when the reference phase of the signal is indicated, the multiplexer will select the video data from latch 75, and when the video phase of the signal is indicated, the multiplexer will select the reference data. When the phase clock switches, a latch 81 captures the output of the multiplexer 80. Hence, when the phase clock switches from reference to video phase, latch 81 captures the video data, and, conversely, latch 81 captures the reference data when the phase clock switches from the video to reference phase. The digital to analog converter 73 converts the data from latch 72 into an analog test signal which is injected into the signal processing circuitry by amplifier 76 in place of the actual signals from imager 10. The microprocessor can prepare an arbitrary analog test pattern (including changes in reference level) which can exercise the full range of the analog signal processing circuitry in a very dynamic fashion since the test data signals can be varied on an equivalent photosite-to-photosite basis.

It should be noted that the amount of memory space required in memory 52 for gain and offset data is very small. For a 480 element three color imager, 2880 bytes are required for 8 bit gain and offset values. Since currently available reasonably priced memories have at least 8 to 16 kilobytes, there is substantial unused space in the memory. Test signal generation in accordance with the invention makes effective use of this otherwise wasted space in the memory. In addition, a PROM is replaced with a multiplexer and a latch. In practice, these elements can be included in the image scanning system control logic device, so they are not actually separate devices. Hence, the additional dynamic test capabilities of the invention, as opposed to the static test of the FIG. 1 apparatus, are provided while actually reducing the number of parts in the system.

In summary, there has been described test apparatus for both analog and digital test signal generation from otherwise unused portions of the gain and offset correction memory. This apparatus allows the generation of a much more dynamic test signal which allows a more effective simulation of a real image scanner signal at no additional cost penalty to the system. The invention has been described with reference to a preferred embodiment. However, it will be appreciated that variations and modifications can be effected by a person of ordinary skill in the art without departing from the scope of the invention.

PARTS LIST

10 CCD digital imaging device
11 amplifier
20 reference sample and hold circuit
22 subtractor
23 video sample and hold circuit
25 multiplier
26 digital to analog converter
27 summer
28 digital to analog converter
29 gain/offset data latch
30 digital to analog converter
31 video data latch
32 buffer
33 test data latch
34 buffer
40 LUT memory
45 FIFO memory
46 buffer
50 pixel counter
52 RAM memory
53 buffer
73 digital to analog converter
74 programmable read-only memory
75 test signal select latch
79 test signal latch
80 multiplexer
81 latch
100 microprocessor

What is claimed is:

1. Test apparatus for an image scanning system having a digital imaging device with at least one line of light-responsive photosites for producing a linear scan of image pixel analog signals and an analog signal processing channel for processing said image pixel signals derived from said imaging device, the test apparatus comprising:

means for supplying a map of photosite variable test data signals simulating photosite-by-photosite-variable analog data signals from the imaging device;

counter means for supplying count values corresponding to individual photosites in the imaging device;

memory means for storing said map of photosite variable test data signals at memory addresses corresponding to said photosite count values;

means operative during a test operation for inhibiting processing in said analog signal channel of image pixel analog signals from said imaging device; and test signal supply means responsive to said counter means and memory means during said test operation for supplying said photosite variable test data signals as analog signals on a simulated photosite-by-photosite-variable basis for processing in said analog signal channel.

2. Test apparatus according to claim 1 in which said signal processing channel comprises a digital signal processing channel and wherein said test signal supply means substitutes digital test data signals directly from said memory means into said digital signal processing channel.

3. Test apparatus according to claim 1 in which said signal processing channel comprises an analog signal processing channel and wherein said test signal supply means includes a digital-to-analog converter for converting said test data signals into analog signals for processing in said analog signal processing channel.

4. Test apparatus according to claim 3 wherein said test data signals comprise signals corresponding separately to a reference phase and a video phase in the signals for each of the photosites from the imaging device.

5. A method of testing a digital image scanning system having a digital imaging device with at least one line of light-responsive photosites for producing a linear scan of image pixel analog signals and an analog signal processing channel for processing said image pixel signals derived from said imaging device, the method comprising the steps of:

supplying a map of photosite variable test data signals simulating photosite-by-photosite-variable analog data signals from the imaging device;

storing said map of photosite variable test data signals in memory means at memory addresses corresponding to individual photosites in the imaging device;

initiating a test operation by inhibiting processing in said analog signal channel of image pixel signals from said imaging device; and supplying said photosite variable test data signals as analog signals on a photosite-by-photosite-variable basis for processing in said analog signal channel.

* * * * *